United States Patent
Nishikawa et al.

[11] Patent Number: 5,969,055
[45] Date of Patent: Oct. 19, 1999

[54] LIQUID CRYSTAL ALIGNMENT AGENT

[75] Inventors: Michinori Nishikawa, Suzuka; Kyouyu Yasuda, Tsu; Shigeo Kawamura, Yokkaichi; Tsukasa Toyoshima, Yokkaichi; Yasuo Matsuki, Yokkaichi; Kengo Wakabayashi, Yokohama, all of Japan

[73] Assignee: JSR Corporation, Tokyo, Japan

[21] Appl. No.: 08/981,829

[22] PCT Filed: May 15, 1997

[86] PCT No.: PCT/JP97/01635

§ 371 Date: Jan. 15, 1998

§ 102(e) Date: Jan. 15, 1998

[87] PCT Pub. No.: WO97/43687

PCT Pub. Date: Nov. 20, 1997

[30] Foreign Application Priority Data

May 16, 1996 [JP] Japan ................................ 8-146840
Dec. 12, 1996 [JP] Japan ................................ 8-352142

[51] Int. Cl.$^6$ ............................ G02F 1/1337; G02F 1/13; C09K 19/56
[52] U.S. Cl. ........................ 525/419; 525/425; 525/428; 525/430; 252/299.4
[58] Field of Search ................................ 525/419, 425, 525/428, 430; 252/299.4

[56] References Cited

U.S. PATENT DOCUMENTS

| | | |
|---|---|---|
| 5,276,132 | 1/1994 | Nishikawa et al. . |
| 5,298,590 | 3/1994 | Isogai et al. ............................ 528/188 |
| 5,478,682 | 12/1995 | Nishikawa et al. . |
| 5,612,450 | 3/1997 | Mizushima et al. . |
| 5,698,135 | 12/1997 | Nishikawa et al. . |
| 5,700,860 | 12/1997 | Nishikawa et al. . |

FOREIGN PATENT DOCUMENTS

| | | |
|---|---|---|
| 63-243917 | 10/1988 | Japan . |
| 64-4720 | 1/1989 | Japan . |
| 64-6924 | 1/1989 | Japan . |
| 1-295226 | 11/1989 | Japan . |

*Primary Examiner*—Nathan M. Nutter
*Attorney, Agent, or Firm*—Oblon, Spivak, McClelland, Maier & Neustadt, P.C.

[57] ABSTRACT

A liquid crystal alignment agent containing at least two kinds of polymers selected from the group consisting of polyamic acids and imidized polymers and having a structure obtained by dehydration and ring closure of polyamic acid. In the at least two kinds of polymers contained in the liquid crystal alignment agent, the polymer of higher imidization degree has a smaller surface free energy. The liquid crystal alignment agent gives a liquid crystal display device having less stuck image and high pretilt angle.

10 Claims, No Drawings

LIQUID CRYSTAL ALIGNMENT AGENT

This application claims the benefit under 35 USC 371 of prior PCT International Application No. PCT/JP 97/01635 which has an international filing date of May 15, 1997.

TECHNICAL FIELD

The present invention relates to a liquid crystal alignment agent. More specifically, the present invention relates to a liquid crystal alignment agent which can give a liquid crystal alignment film having good liquid crystal alignability and can provide a liquid crystal display device with a high pretilt angle and excellent stuck image-free properties.

BACKGROUND ART

There have heretofore been known TN type liquid crystal display devices having a TN (twisted nematic) type liquid crystal cell which comprises two substrates each having, on the surface, a liquid crystal alignment film via a transparent electroconductive film and a nematic liquid crystal layer having a positive dielectric anisotropy, the nematic liquid crystal layer being interposed between the two substrates so as to form a sandwich structure, in which liquid crystal cell the major axes of liquid crystal molecules are continuously twisted by 90° in the direction extending from one of the substrates to the other substrate. The alignment of liquid crystal in the TN type liquid crystal devices is made generally by a liquid crystal alignment film imparted with an alignability for liquid crystal molecules by a rubbing treatment. As the material for the liquid crystal alignment film, there are hitherto known resins such as polyimide, polyamide, polyester and the like. Polyimides, in particular, are used in many liquid crystal display devices because of the excellency in heat resistance, compatibility with liquid crystal, mechanical strengths, etc.

When a TN type liquid crystal display device is produced using a liquid crystal alignment film formed of conventionally used polyimide or the like, however, the liquid crystal display device has problems in that it gives defective display due to its low pretilt angle or an image sticking is caused owing to its a large residual voltage. Hence, it has been desired to develop a liquid crystal alignment agent capable of giving a liquid crystal display device which has a liquid crystal alignment film of good liquid crystal alignability and a high pretilt angle and is excellent in low image retention properties.

DISCLOSURE OF THE INVENTION

The present invention has been completed in view of the above situation. The first object of the present invention is to provide a liquid crystal alignment agent capable of giving a liquid crystal alignment film superior in liquid crystal alignability.

The second object of the present invention is to provide a liquid crystal alignment agent capable of providing a high pretilt angle.

The third object of the present invention is to provide a liquid crystal alignment agent giving a liquid crystal alignment film for a liquid crystal display device having excellent image retention properties.

The other objects and advantages of the present invention will become apparent from the following description.

The above-mentioned objects and advantages of the present invention can be achieved by a liquid crystal alignment agent containing at least two kinds of polymers selected from the group consisting of polyamic acids and imidized polymers having a structure obtained by dehydration and ring closure of polyamic acid, wherein in the at least two kinds of polymers contained in the liquid crystal alignment agent, the polymer of higher imidization degree has a smaller surface free energy.

The liquid crystal alignment agent of the invention may further contain an epoxy compound as an additive. In this case, it is preferable that the at least two kinds of the polymers have an average imidization degree of 5 to 40%. The liquid crystal alignment agent containing an epoxy compound possesses an effect of giving an excellent long-term stability to the resulting liquid crystal display device.

The present invention is hereinafter described in detail.

Each polymer used in the liquid crystal alignment agent of the present invention can be obtained by reacting at least one tetracarboxylic acid dianhydride and at least one diamine compound both mentioned below in an organic solvent to synthesize a polyamic acid and, as necessary, subjecting the polyamic acid to dehydration and ring closure.

[Tetracarboxylic acid dianhydride]

As the tetracarboxylic acid dianhydride used in the synthesis of the above polyamic acid, there can be mentioned, for example, aliphatic or alicyclic tetracarboxylic acid dianhydrides such as butanetetracarboxylic acid dianhydride, 1,2,3,4-cyclobutanetetracarboxylic acid dianhydride, 1,2-dimethyl-1,2,3,4-cyclobutanetetracarboxylic acid dianhydride, 1,3-dimethyl-1,2,3,4-cyclobutanetetracarboxylic acid dianhydride, 1,3-dichloro-1,2,3,4-cyclobutanetetracarboxylic acid dianhydride, 1,2,3,4-tetramethyl-1,2,3,4-cyclobutanetetracarboxylic acid dianhydride, 1,2,3,4-cyclopentanetetracarboxylic acid dianhydride, 1,2,4,5-cyclohexanetetracarboxylic acid dianhydride, 3,3',4,4'-dicyclohexyltetracarboxylic acid dianhydride, 2,3,5-tricarboxycyclopentylacetic acid dianhydride, 3,5,6-tricarboxynorbornane-2-acetic acid dianhydride, 2,3,4,5-tetrahydrofurantetracarboxylic acid dianhydride, 1,3,3a, 4,5,9b-hexahydro-5-(tetrahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, 1,3,3a,4,5,9b-hexahydro-5-ethyl-5-(tetrahydro-2,5-dioxo-3-furanyl)-naphtho[1,2-c]furan-1,3-dione, 1,3,3a,4,5,9b-hexahydro-7-methyl-5-(tetrahydro-2,5-dioxo-3-furanyl)-naphtho[1,2-c]furan-1,3-dione, 1,3,3a,4,5,9b-hexahydro-7-ethyl-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-8-ethyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]furan-1,3-dione, 5-(2,5-dioxotetrahydrofural)-3-methyl-3-cyclohexene-1,2-dicarboxylic acid dianhydride, bicyclo[2,2,2]-octo-7-ene-2,3,5,6-tetracarboxylic acid dianhydride and compounds represented by the following formulas (I) to (II):

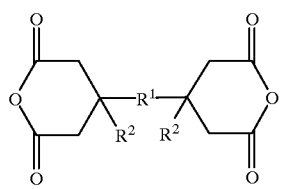

(I)

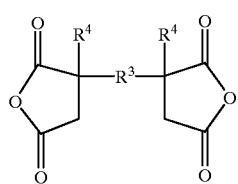

(II)

(wherein R¹ and R³ are each a bivalent organic group having an aromatic ring; R²s and R⁴s are hydrogen atoms or alkyl groups and each of two R²s and two R⁴s may be the same or different); and aromatic tetracarboxylic acid dianhydrides such as pyromellitic acid dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenyl ether tetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)-diphenyl sulfide dianhydride, 4,4'-bis(3,4-dicarboxyphenoxy)-diphenylsulfone dianhydride, 4,4'-bis(3,4-dicarboxyphenoxy)-diphenylpropane dianhydride, 3,3',4,4'-perfluoroisopropylidenediphthalic acid dianhydride, 3,3',4,4'-biphenyltetra-carboxylic acid dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid) -4,4'-diphenyl ether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate),2,2-bis(4-hydroxyphenyl)propane-bis(anhydrotrimellitate) and the compounds represented by the following formulas (1) to (4). These compounds can be used singly or in combination of two or more kinds.

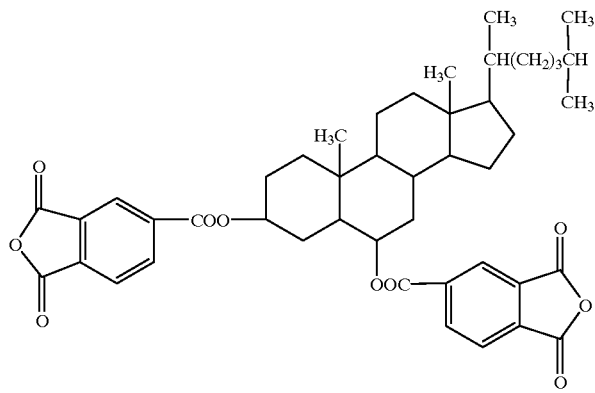

(1)

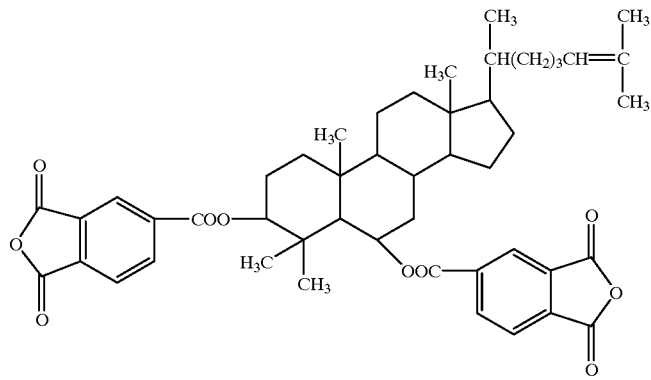

(2)

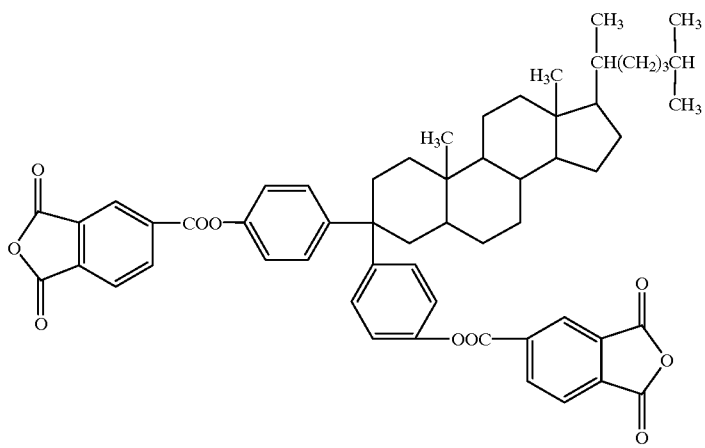

(3)

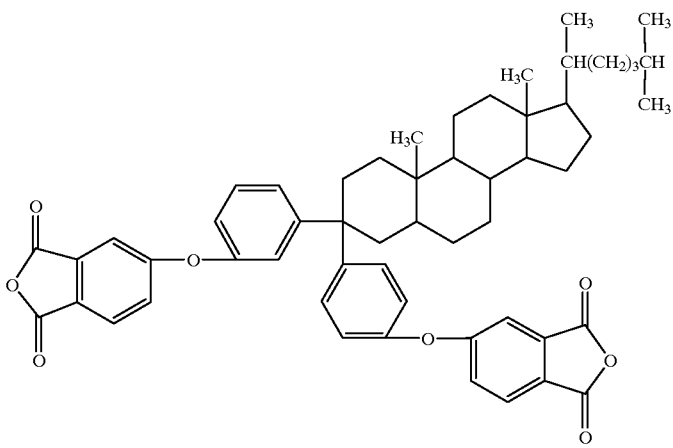

(4)

Of the above compounds, the following compounds are preferred from the viewpoint of achievement of good liquid crystal alignability:

Butanetetracarboxylic acid dianhydride, 1,2,3,4-cyclobutanetetracarboxylic acid dianhydride, 1,3-dimethyl-1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 5-(2,5-dioxotetrahydrofural)-3-methyl-3-cyclohexene-1,2-dicarboxylic acid dianhydride, 1,3,3a, 4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5, 9b-hexahydro-5,8-dimethyl-5-(tetrahydro-2,5-dioxo-3-furanyl)-naphtho[1,2-c]-furan-1,3-dione, bicyclo[2,2,2]-octo-7-ene-2,3,5,6-tetra-carboxylic acid dianhydride, pyromellitic acid dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride, the compounds represented by the following formulas (5) to (7) out of the compounds of the formula (I), and the compounds represented by the following formula (8) out of the compounds of the formula (II). Particularly preferred are 1,2,3,4-cyclobutane-tetracarboxylic acid dianhydride, 1,3-dimethyl-1,2,3,4-cyclobutanetetracarboxylic acid dianhydride, 2,3,5-tricarboxycyclopentylacetic acid dianhydride, 1,3,3a, 4,5,9b-hexahydro-5-(tetrahydro-2,5-dioxo-3-furanyl)-naphtho[2-c]furan-1,3-dione, 1,3,3a,4,5, 9b-hexahydro-8-methyl-5-(tetrahydro-2,5-dioxo-3-furanyl)-naphtho[1,2-c]furan-1,3-dione, pyromellitic acid dianhydride and the compounds represented by the following formula (5).

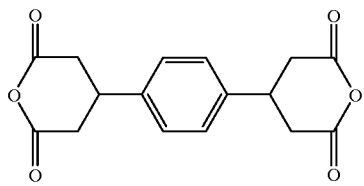

(5)

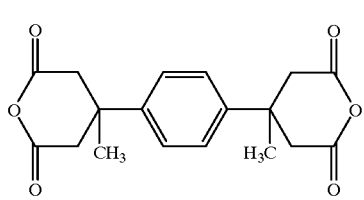

(6)

-continued

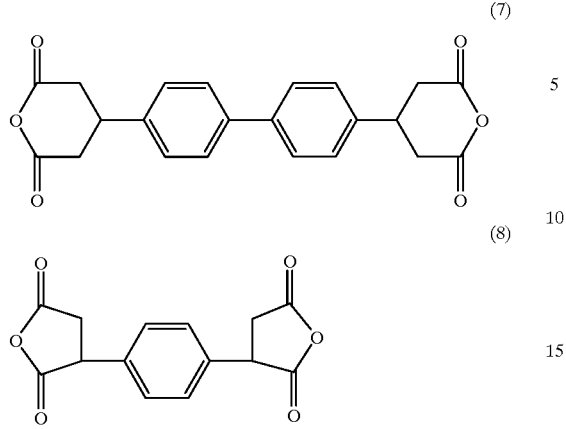

[Diamine Compound]

As the diamine compound used in the synthesis of the polyamic acid, there can be mentioned, for example, aromatic diamines such as p-phenylenediamine, m-phenylenediamine, 4,4'-diaminodiphenylmethane, 4,4'-diaminodiphenylethane, 4,4'-diaminodiphenyl sulfide, 4,4'-diaminodiphenylsulfone, 3,3'-dimethyl-4, 4'-diaminobiphenyl, 4,41-diaminobenzanilide, 4,4'-diaminodiphenyl ether, 1,5-diaminonaphthalene, 3,3-dimethyl-4,4'-diaminobiphenyl, 5-amino-1-(4'-aminophenyl)- 1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)-phenyl]hexafluoropropane, 2,2-bis(4-aminophenyl)hexafluoropropane, 2,2-bis[4-(4-amino-phenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diamino-fluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 1,4,4'-(p-phenylene-isopropylidene)bisaniline, 4,4'-(m-phenyleneisopropylidene)bisaniline, 2,2'-bis[4-(4-amino-2-trifluoromethylphenoxy)phenyl]-hexafluoropropane, 4,4'-diamino-2,2'-bis(trifluoromethyl)biphenyl, 4,4'-bis[(4-amino-2-trifluoromethyl)phenoxy]-octafluorobiphenyl and the like;

aliphatic or alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo [6.2.1.0²,⁷]-undecylenedimethyldiamine, 4,4'-methylene bis-(cyclohexylamine) and the like;

diamines having, in the molecule, two primary amino groups and a nitrogen atom(s) other than the above primary amino groups, such as 2,3-diaminopyridine, 2,6-diaminopyridine, 3,4-diaminopyridine, 2,4-diaminopyridine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethoxyacridine lactate, 3,8-diamino-6-phenylphenanthridine, 1,4-diaminopiperazine, 3,6-diaminoacridine, bis(4-aminophenyl)phenylamine, the compounds represented by the following formulas (III) to (VI), and the like;

(III)

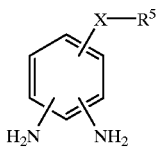

(wherein $R^5$ is a monovalent organic group having a nitrogen-containing ring structure selected from the group consisting of pyridine, pyrimidine, triazine, piperidine and piperazine; and X is a bivalent organic group)

(IV)

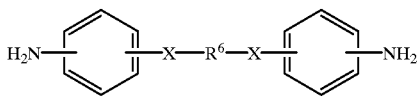

(wherein $R^6$ is a bivalent organic group having a nitrogen-containing ring structure selected from the group consisting of pyridine, pyrimidine, triazine, piperidine and piperazine; and Xs may be the same or different and are each a bivalent organic group) mono-substituted phenylenediamines represented by the following formula (V):

(V)

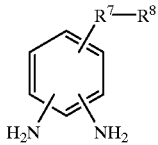

(wherein $R^7$ is a bivalent organic group selected from the group consisting of —O—, —COO—, —OCO—, —NHCO—, —CONH— and —CO—; and $R^8$ is a monovalent organic group having a group selected from the group consisting of a steroid skeleton, a trifluoromethyl group and a fluoro group, or a $C_{6-30}$ alkyl group);

diaminoorganosiloxanes represented by the following formula (VI):
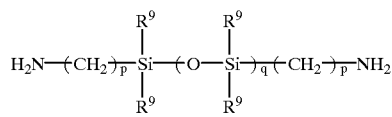
(VI)
(wherein $R^9$s may be the same or different and are each a $C_{1-12}$ hydrocarbon group; p is an integer of 1 to 3; and q is an integer of 1 to 20); and
compounds represented by the following formulas (9) to (13). These diamine compounds can be used singly or in combination of two or more kinds.
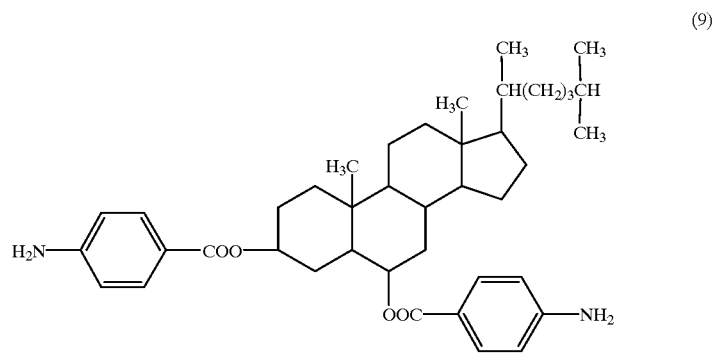
(9)
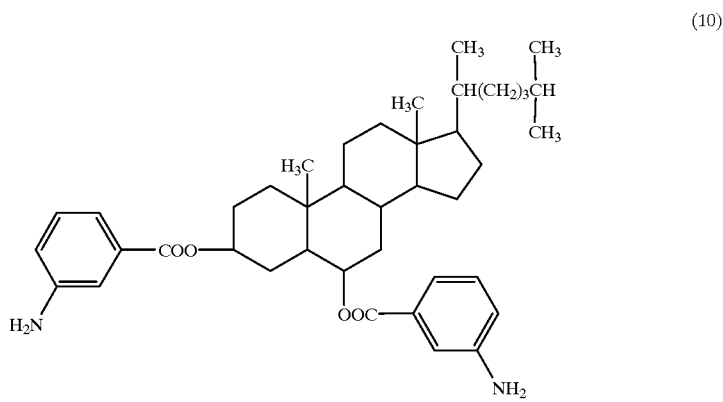
(10)
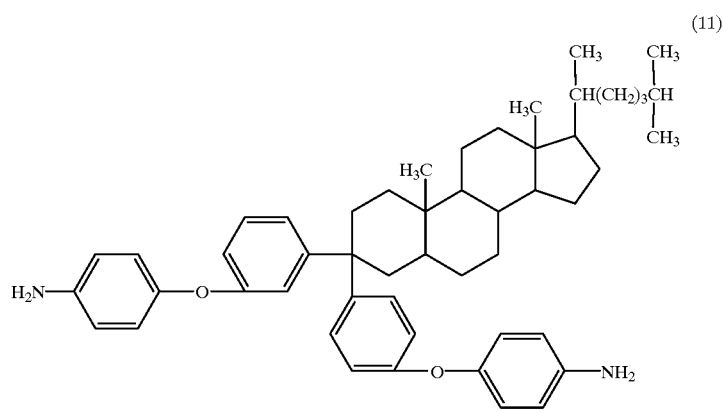
(11)
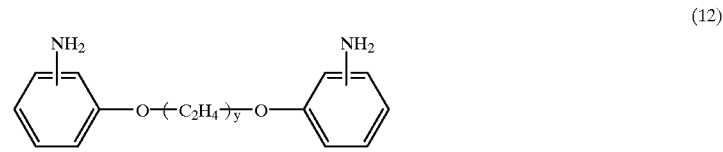
(12)

(13)

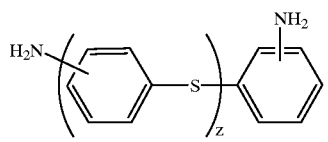

In the above formulas, y is an integer of 2 to 12 and z is an integer of 1 to 5.

Of the above compounds, preferred are p-phenylenediamine, 4,4'-diaminodiphenylmethane, 4,4'-diaminodiphenyl sulfide, 1,5-diaminonaphthalene, 2,7-diaminofluorene, 4,4'-diaminodiphenyl ether, 2,2-bis[4-(4-aminophenoxy)phenyl]-propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-cyclohexanediamine, 4,4'-methylene bis(cyclohexylamine), 1,4-bis(4-aminophenoxy)benzene, 4,4'-bis(4-aminophenoxy)biphenyl, the compounds represented by the above formulas (9) to (13), 2,6-diaminopyridine, 3,4-diaminopyridine, 2,4-diaminopyridine, 3,6-diaminoacridine, the compounds represented by the following formula (14) out of the compounds represented by the above formula (III), the compounds represented by the following formula (15) out of the compounds represented by the above formula (IV), and the compounds represented by the following formulas (16) to (21) out of the compounds represented by the above formula (V).

(14)

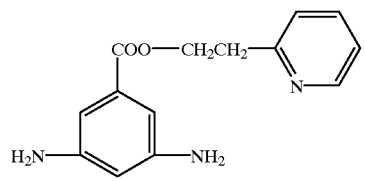

(15)

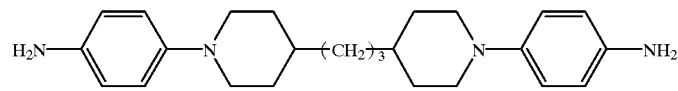

(16)

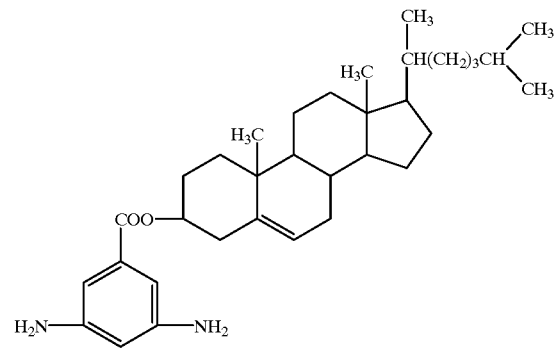

(17)

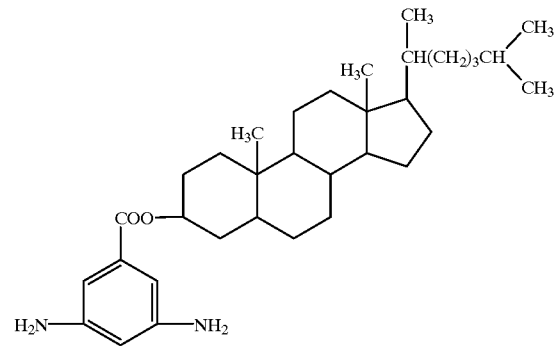

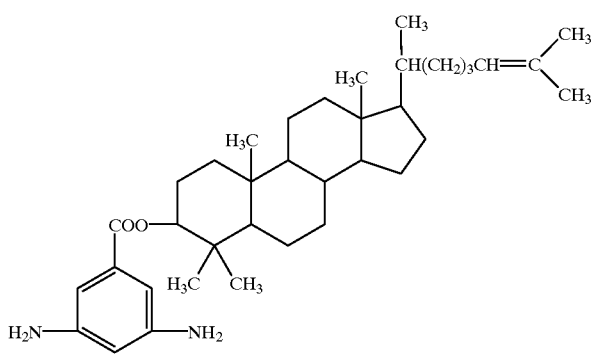

(18)

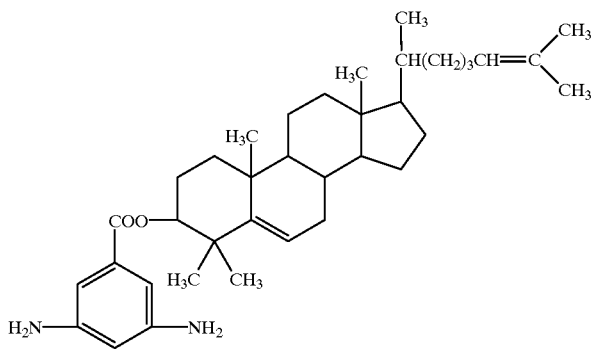

(19)

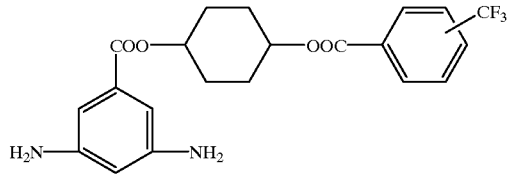

(20)

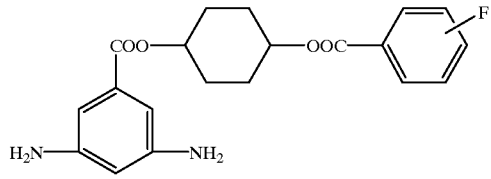

(21)

[Polyamic Acid]

The tetracarboxylic acid dianhydride and the diamine compound used in the synthesis of the polyamic acid are used in such proportions that the acid anhydride group contained in the tetracarboxylic acid dianhydride is preferably 0.2 to 2 equivalents, more preferably 0.3 to 1.2 equivalents per 1 equivalent of the amino group contained in the diamine compound.

The synthesis of the polyamic acid is conducted in an organic solvent usually at a reaction temperature of 0 to 150° C., preferably 0 to 100° C., for 1 to 48 hours. There is no particular restriction as to the kind of the organic solvent used as long as the solvent can dissolve the reaction products produced by the reaction. As the organic solvent, there can be mentioned, for example, aprotic polar solvents such as N-methyl-2-pyrrolidone, N,N-dimethylacetamide, N,N-dimethyl-formamide, dimethyl sulfoxide, γ-butyrolactone, propylene carbonate, tetramethylurea, hexamethylphosphoryl triamide and the like; and phenolic solvents such as m-cresol, xylenol, phenol, halogenated phenol and the like. The preferable amount of the organic solvent used is usually such that the total amount of the tetracarboxylic acid dianhydride and the diamine compound accounts for 0.1 to 30% by weight of the total amount of the reaction solution.

The above organic solvent can be used in combination with a poor solvent for the polyamic acid, such as alcohol, ketone, ester, ether, halogenated hydrocarbon, hydrocarbon or the like so long as the addition of the poor solvent does not cause precipitation of the formed polyamic acid. Specific examples of such a poor solvent include methyl alcohol, ethyl alcohol, isopropyl alcohol, cyclohexanol, ethylene glycol, propylene glycol, 1,4-butanediol, triethylene glycol, acetone, methyl ethyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol monophenyl ether, ethylene glycol methylphenyl ether, ethylene glycol ethylphenyl ether, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, ethylene glycol methyl ether acetate, ethylene glycol ethyl ether acetate, 4-hydroxy-4-methyl-2-petanone, 2,4-pentane-dione, 2,5-hexanedione, ethyl 2-hydroxypropionate, ethyl 2-hydroxy-2-methylpropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, hydroxymethyl pyruvate, methyl acetoacetate, ethyl acetoacetate, methylmethoxybutanol, ethylmethoxybutanol, methylethoxybutanol, ethylethoxybutanol, tetrahydrofuran, tetrahydrofurfuryl alcohol, tetrahydro-3-furanmethanol, 1,3-dioxolane, 1,3-dioxepane, 4-methyl-1,3-dioxolane, dichloromethane, 1,2-dichloroethane, 1,4-dichlorobutane, trichloroethane, chlorobenzene, o-dichloroethane, hexane, heptane, octane, benzene, toluene, xylene, and the like. These solvents can be used singly or in combination of two or more kinds.

By the above synthesis can be obtained a reaction solution containing a polyamic acid dissolved therein. The reaction solution is poured into a large amount of a poor solvent to obtain a precipitate, and the resulting precipitate is dried under reduced pressure, whereby a polyamic acid can be obtained. Further, this polyamic acid can be purified by again dissolving it in an organic solvent and then conducting a step to precipitate it with the poor solvent once or several times.

[Imidized Polymer]

The imidized polymer constituting the liquid crystal alignment agent of the present invention can be produced by subjecting the polyamic acid to dehydration and ring closure. The dehydration and ring closure of the polyamic acid is conducted by (i) a method of heating the polyamic acid, or (ii) a method of dissolving the polyamic acid in an organic solvent, adding thereto a dehydrating agent and a catalyst for dehydration and ring closure and, as necessary, followed by heating.

In the method (i) of heating the polyamic acid, the reaction temperature is usually 50 to 200° C., preferably 60 to 170° C. When the reaction temperature is lower than 50° C., the dehydration and ring closure reaction does not proceed sufficiently. When the reaction temperature is higher than 200° C., the imidized polymer obtained may have a decreased molecular weight in some case.

Meanwhile, in the method (ii) of adding a dehydrating agent and a catalyst for dehydration and ring closure to a solution of the polyamic acid, there can be used, as the dehydrating agent, for example, an acid anhydride such as acetic anhydride, propionic anhydride, trifluoroacetic anhydride or the like. The amount of the dehydrating agent used is preferably 0.01 to 20 moles per mole of the recurring unit of the polyamic acid. As the catalyst for dehydration and ring closure, there can be used, for example, a tertiary amine such as pyridine, collidine, lutidine, triethylamine or the like. However, the catalyst is not restricted thereto. The amount of the catalyst for dehydration and ring closure is preferably 0.01 to 10 moles per mole of the dehyrating agent used. Incidentally, as the organic solvent used in the dehydration and ring closure, there can be cited those specific organic solvents mentioned in the synthesis of polyamic acid. The reaction temperature of the dehydration and ring closure is usually 0 to 180° C., preferably 10 to 150° C. By applying, to the thus-obtained reaction solution, the same operation as employed in the purification of the polyamic acid, the formed imidized polymer can be purified.

[Terminal-modified Polymer]

The polymer constituting the liquid crystal alignment agent of the present invention may be a terminal-modified polymer having controlled molecular weight. By using a terminal-modified polymer, the coating properties, etc. of the liquid crystal alignment agent can be improved without impairment of the effects of the present invention. The terminal-modified polymer can be synthesized by adding an acid monoanhydride, a monoamine compound, a monoisocyanate compound or the like to the reaction system, in the synthesis of polyamic acid. As the acid monoanhydride, there can be mentioned, for example, maleic anhydride, phthalic anhydride, itaconic anhydride, n-decylsuccinic anhydride, n-dodecylsuccinic anhydride, n-tetradecylsuccinic anhydride, n-hexadecylsuccinic anhydride and the like. As the monoamine compound, there can be mentioned, for example, aromatic monoamines such as aniline and the like; cycloalkylmonoamines such as cyclohexylamine and the like; alkylmono-amines such as n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine and the like; and monoaminosilanes such as 3-aminopropyltrimethoxysilane, 3-aminopropyltriethoxysilane, 2-aminopropyltrimethoxysilane, 2-aminopropyltriethoxysilane, N-ethoxycarbonyl-3-aminopropyltrimethoxy-silane, N-ethoxycarbonyl-3-aminopropyltriethoxysilane, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyl-triethoxysilane and the like. As the monoisocyanate compound, there can be mentioned, for example, phenyl isocyanate, naphthyl isocyanate and the like.

[Logarithmic Viscosity of Polymer]

The polymer constituting the liquid crystal alignment agent of the present invention has a logarithmic viscosity ($\eta$ln) of preferably 0.05 to 10 dl/g, more preferably 0.05 to 5 dl/g. Herein, the logarithmic viscosity ($\eta$ln) is determined by measuring a solution containing a polymer in a concentration of 0.5 g/100 ml for its viscosity at 30° C. using an N-methyl-2-pyrrolidone as a solvent and calculating from the following formula (i).

$$\eta\text{ln} = \ln[(\text{flowing time of solution})/(\text{flowing time of solvent})] / (\text{weight concentration of polymer, g/dl}) \quad (i)$$

[Imidization Degree of Polymer]

The imidization degree of each polymer used in the liquid crystal alignment agent of the invention can be arbitrarily adjusted by controlling the catalyst amount, reaction time and reaction temperature employed in production of the polymer. In the present description, "imidization degree" of polymer refers to a proportion (expressed in %) of the number of recurring units of polymer forming an imide ring or an isoimide ring to the number of total recurring units of polymer. In the present description, the imidization degree of a polyamic acid not subjected to dehydration and ring closure is 0%. The imidization degree of each polymer is determined by dissolving the polymer in deuterated dimethyl sulfoxide, subjecting the resulting solution to $^1$H-NMR measurement at a room temperature using tetramethylsilane as a standard substance, and calculating from the following formula (ii).

$$\text{Imidization degree (\%)} = (1 - A^1/A^2 \times \alpha) \times 100 \tag{ii}$$

$A^1$: Peak area based on protons of NH groups (in the vicinity of 10 ppm)

$A^2$: Peak area based on other protons $\alpha$: Proportion of the number of other protons to one proton of NH group in polymer precursor (polyamic acid)

[Liquid Crystal Alignment Agent]

The liquid crystal alignment agent of the present invention is constituted by at least two kinds of polymers dissolved in an organic solvent.

The at least two kinds of polymers in the liquid crystal alignment agent of the invention have a characteristic feature in that the polymer of higher imidization degree has a smaller surface free energy. In the at least two polymers constituting the liquid crystal alignment agent of the invention, the difference in imidization degree between the polymer of highest imidization degree and the polymer of lowest imidization degree is preferably 5% or more, particularly preferably 10% or more. Further, the liquid crystal alignment film obtained from the liquid crystal alignment agent of the invention has a surface free energy of preferably 40 to 60 dyn/cm.

The content of the polymers in the liquid crystal alignment agent of the invention is determined taking consideration of the viscosity, volatility and the like of the alignment agent, but is preferably 0.1 to 20% by weight, more preferably 1 to 10% by weight based on the total weight of the liquid crystal alignment agent. That is, the liquid crystal alignment agent consisting of a polymer solution is coated on the surface of a substrate by a printing method, spin coating method or the like and then dried, whereby a coating film which is a material for alignment film is formed. When the content of polymers is lower than 0.1% by weight, the alignment agent gives a film of too small thickness, making it impossible in some cases to obtain a good liquid crystal alignment film. When the content of polymers is higher than 20% by weight, the alignment agent gives a film of too large thickness, making it impossible to obtain a good liquid crystal alignment film; moreover, the alignment agent has an increased viscosity and in consequence, has inferior coating properties in some cases.

There is no particular restriction as to the organic solvent used for dissolving polymers, as long as the solvent can dissolve the polymers. As the organic solvent, there can be mentioned, for example, those specific organic solvents mentioned in the synthesis reaction of polyamic acid or its dehydration and ring closure reaction. There can also be used, in appropriate combination with the above organic solvent, the poor solvents mentioned for combination use with an organic solvent in the synthesis reaction of polyamic acid.

[Epoxy Compound]

The liquid crystal alignment agent of the present invention preferably contains an epoxy compound as an additive. The epoxy compound is preferably a nitrogen-containing epoxy compound. As specific examples of the nitrogen-containing epoxy compound, there can be mentioned:

nitrogen-containing epoxy compounds each based on an aromatic monoamine, such as N,N-diglycidylaniline, N, N-diglycidyltoluidine and the like;

nitrogen-containing epoxy compounds each based on an alicyclic monoamine, such as N,N-diglycidylcyclohexylamine, N,N-diglycidylmethylcyclohexylamine and the like;

nitrogen-containing epoxy compounds each based on an aromatic diamine, such as N,N,N',N'-tetraglycidyl-p-phenylenediamine, N,N,N',N'-tetraglycidyl-m-phenylenediamine, N,N,N',N'-tetraglycidyl-o-phenylenediamine, N,N,N',N'-tetra-glycidyl-4,4'-diamiinodiphenylmethane, N,N,N',N'-tetraglycidyl-3,4'-diaminodiphenylmethane, N,N,N',N'-tetraglycidyl-3,3'-diaminodiphenylmethane, N,N,N',N'-tetraglycidyl-4,4'-diaminodiphenyl sulfide, N,N,N',N'-tetraglycidyl-1,5-diaminonaphthalene, N,N,N'-tetraglycidyl-2,7-diaminofluorene, N,N,N'1,N'-tetraglycidyl-4,4'-diaminodiphenyl ether, N,N,N',N'-tetraglycidyl-2,2-bis[4-(4-aminophenoxy)phenyl]propane, N,N,N ',N'-tetraglycidyl-9,9-bis(4-aminophenyl)fluorene, N,N,N',N'-tetraglycidyl-2,2-bis[4-(4-aminophenoxy)phenyl]-hexafluoropropane, N,N,N',N'-tetraglycidyl-2,2-bis(4-aminophenyl) hexafluoropropane, N,N,N',N'-tetraglycidyl-4,4'-(p-phenylenediisopropylidene)bisaniline, N,N,N$^1$,N'-tetraglycidyl-4,4'-(m-phenylenediisopropylidene) bisaniline, N,N,N',N'-tetraglycidyl-1,4-bis(4-aminophenoxy)benzene, N,N,N',N'-tetraglycidyl-4,4'-bis(4-aminophenoxy)biphenyl and the like;

nitrogen-containing epoxy compounds each based on an alicyclic diamine, such as N,N,N',N'-tetraglycidyl-m-xylylenediamine, N,N,N',N'-tetraglycidyl-p-xylylenediamine, 1,3-bis(N,N'-diglycidylaminomethyl)cyclohexane, 1,4-bis(N,N'-diglycidylaminomethyl)cyclohexane, N,N,N',N'-tetraglycidyl-1,4-cyclohexanediamine, N,N,N',N'-tetraglycidyl-1,3-cyclohexanediamine, N,N,N',N'-tetraglycidyl-4,4'-methylenebis(cyclohexylamine) and the like; and nitrogen-containing epoxy compounds each based on an aliphatic diamine, such as N,N,N',N'-tetraglycidyl-diaminoethane, N,N,N',N'-tetraglycidyl-diaminopropane, N,N,N',N'-tetraglycidyl-diaminobutane, N,N,N',N'-tetraglycidyl-diaminopentane, N,N,N',N'-tetraglycidyl-diaminohexane, N,N,N',N'-tetraglycidyl-diaminoheptane, N,N,N',N'-tetraglycidyl-diaminooctane and the like.

Of these, preferred are nitrogen-containing epoxy compounds each based on an aromatic monoamine, nitrogen-containing epoxy compounds each based on an aromatic diamine, and nitrogen-containing epoxy compounds each based on an alicyclic diamine. Particularly preferred are N,N-diglycidylaniline, N,N,N',N'-tetraglycidyl-4,4'-diaminodiphenylmethane and 1,3-bis(N,N'-diglycidylaminomethyl)cyclohexane.

As other epoxy group-containing compounds containing no nitrogen atom, there can be mentioned, for example, ethylene glycol diglycidyl ether, polyethylene glycol diglycidyl ether, propylene glycol diglycidyl ether, tripropylene glycol diglycidyl ether, polypropylene glycol diglycidyl ether, trimethylolpropane triglycidyl ether, neopentyl glycol diglycidyl ether, 1,6-hexanediol diglycidyl ether, glycerine diglycidyl ether, 2,2-dibromoneopentyl glycol diglycidyl ether and 1,3,5,6-tetraglycidyl-2,4-hexanediol.

The amount of the epoxy compound is 50 parts by weight or less, preferably 0.1 to 40 parts by weight, more preferably 1 to 30 parts by weight, per 100 parts by weight of the polymers in the liquid crystal alignment agent. When the amount of the epoxy compound exceeds 50 parts by weight, the resulting liquid crystal alignment agent may have poor storage stability.

When the epoxy compound is added to the liquid crystal alignment agent of the invention, the average imidization degree of the entire polymer in the alignment agent is preferably 5 to 40%, particularly preferably 5 to 35%, further preferably 5 to 30%. A liquid crystal alignment agent containing polymers of an average imidization degree of above range and an epoxy compound gives a liquid crystal display device of excellent long-term stability.

[Other Additive]

The liquid crystal alignment agent of the present invention may contain a functional silane-containing compound with the view to improve the adhesivity of a polymer to the substrate surface on which the polymer is coated. As the functional silane-containing compound, there can be mentioned, for example, monoaminosilanes usable in the synthesis of the above-mentioned terminal-modified polymer; N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-triethoxysilylpropyltriethylenetriamine, N-trimethoxysilyl-propyltriethylenetriamine, 10-trimethoxysilyl-1,4,7-triaza-decane, 10-triethoxysilyl-1,4-7-triazadecane, 9-trimethoxy-silyl-3,6-diazanonyl acetate and 9-triethoxysilyl-3,6-diazanonyl acetate. The amount of the functional silane-containing compound used is usually 40 parts by weight or less, preferably 0.1 to 30 parts by weight per 100 parts by weight of the polymers.

[Liquid Crystal Display Device]

The liquid crystal display device obtained using the liquid crystal alignment agent of the present invention can be produced, for example, by the following method.

(1) The liquid crystal alignment agent of the present invention is coated on a transparent electroconductive film side of a substrate provided with the transparent electroconductive film subjected to a patterning, by a method such as a roll coater method, spinner coating method, printing method or the like, and then, the coated side of the substrate is heated thereby to form a coating film. As the substrate, there can be used a transparent substrate made of, for example, a glass such as float glass, soda-lime glass or the like or a plastic film of polyethylene terephthalate, polybutylene terephthalate, polyethersulfone, polycarbonate or the like. As the transparent electroconductive film provided on one side of the substrate, there can be used a NESA film made of $SnO_2$ an ITO film made of $In_2O_3$—$SnO_2$, or the like. In patterning of the transparent electroconductive film, a photo-etching method, a masking method or the like can be used.

Prior to coating of the liquid crystal alignment agent, a functional silane-containing compound, titanate or the like may be coated on the substrate and the transparent electroconductive film in order to further increase the adhesion of the film of the alignment agent to the substrate and the transparent electroconductive film. The temperature of heating is 80 to 250° C., preferably 120 to 200° C. The thickness of the film formed is usually 0.001 to 1 μm, preferably 0.005 to 0.5 μm.

(2) The formed coating film is subjected to a rubbing treatment in which the film surface is rubbed with a roll wound with a cloth made of a nylon or the like in a given direction, whereby the film is imparted with an alignability for liquid crystal molecules and becomes a liquid crystal alignment film. Besides the rubbing treatment, there can be used for obtaining a liquid crystal alignment film a method of applying a polarized ultraviolet light to the surface of the coated film to impart the film with liquid crystal alignability or a method to form a liquid crystal alignment film by a uniaxial stretching method, a Langmuir-Blodgett method or the like. In order to remove fine powders (foreign materials) generating during the rubbing treatment to obtain a clean film surface, it is desirable to wash the liquid crystal alignment film formed, with isopropyl alcohol or the like. In order to obtain a liquid crystal display device having an improved view angle, it is possible to perform a treatment comprising applying an ultraviolet light partially to the liquid crystal alignment film formed with the liquid crystal alignment agent of the invention to change the pretilt angle (as disclosed in, for example, Japanese Laid-Open Patent Publication No. 6-222366 or Japanese Laid-Open Patent Publication No. 6-281937), or a treatment comprising forming a resist film partially on the liquid crystal alignment film subjected to a rubbing treatment, conducting a rubbing treatment in a direction different from the direction of the prior rubbing treatment and then, removing the resist film thereby to change the alignability of a liquid crystal alignment film (as disclosed in Japanese Laid-Open Patent Publication No. 5-107544).

(3) Two substrates each having a liquid crystal alignment film formed thereon are prepared as described above. They are allowed to face each other via a gap (cell gap) in such a way that the rubbing directions of the two alignment films become perpendicular to each other or parallel in an opposite direction to each other. Then, the peripheries of the two substrates are stuck to each other using a sealing agent. A liquid crystal is filled into the cell gap defined by the substrates and the sealing agent, and the filling hole is sealed. Thus, a liquid crystal cell is formed. Onto the outer surfaces of the liquid crystal cell, i.e. the other side of each substrate constituting the liquid crystal cell is adhered a polarizing film in such a way that the polarization direction of each polarizing film is identical or perpendicular to the rubbing direction of the liquid crystal alignment film formed on one side of each substrate, whereby a liquid crystal display device is obtained.

As the sealing agent, there can be used, for example, an epoxy resin containing a curing agent and spherical aluminum oxide as spacer.

The liquid crystal is preferably a nematic liquid crystal or a smectic liquid crystal with the former nematic liquid crystal being preferred. There is used, for example, a Schiff's base liquid crystal, an azoxy liquid crystal, a biphenyl liquid crystal, a phenylcyclohexane liquid crystal, an ester liquid crystal, a terphenyl liquid crystal, a biphenylcyclohexane liquid crystal, a pyrimidine liquid crystal, a dioxane liquid crystal, a bicyclooctane liquid crystal or a cubane liquid crystal. It is possible to add, to such a liquid crystal, a cholesteric liquid crystal such as cholesteryl chloride, cholesteryl nonanate or cholesteryl carbonate, a chiral agent [e.g. C-15 or CB-15 (trade name), a product of Merck Ltd.] or the like. There can also be used a ferroelectric liquid crystal such as p-decyloxybenzylidene-p-amino-2-methylbutyl cinnamate or the like.

As the polarizing plate used on the outer surface of the liquid crystal cell, there can be mentioned, for example, a polarizing plate obtained by, while stretching a polyvinyl alcohol for orientation, allowing a film to absorb iodine to form a polarizing film (called a H film) and interposing the film between protective films formed of cellulose acetate, and a polarizing plate which is the H film itself.

EXAMPLES

The present invention is hereinafter described more specifically by way of Examples. However, the present invention is not restricted to these Examples.

First, there are mentioned the methods of evaluations for the liquid crystal display devices produced in the following Examples and Comparative Examples.

[Surface Free Energies of Polymer and Liquid Crystal Alignment Film]

Each polymer was dissolved in N-methyl-2-pyrrolidone. The resulting solution was coated on a silicon wafer by a spin coating. The coated wafer was heated at 100° C. for 3 hours to form a thin film. Then, the polymer and liquid crystal alignment film were determined for surface free energy from the contact angle of pure water and the contact angle of methylene iodide on the above-obtained thin film and the liquid crystal alignment film obtained in each Example, in accordance with the method of D. K. Owens et al. described in "JOURNAL OF APPLIED POLYMER SCIENCE VOL. 13, PP. 1741–1747 (1969)", as follows.

In a system where a liquid is in contact with the surface of a solid, the relation between the surface free energy (also called as surface tension) of the liquid, the surface free energy of the solid and the contact angle is shown by the following formula (iii).

$$(1+\cos\theta) \times \gamma_L = 2(\gamma_s^d \times \gamma_L^d)^{1/2} + 2(\gamma_s^p \times \gamma_L^p)^{1/2} \quad \text{(iii)}$$

$\gamma_L$: a surface free energy of the liquid
$\gamma_L^d$: a dispersion term of the surface free energy of the liquid
$\gamma_L^p$: a polarity term of the surface free energy of the liquid
$\gamma_s^d$: a dispersion term of the surface free energy of the solid
$\gamma_s^p$: a polarity term of the surface free energy of the solid
$\theta$: Contact angle Under the condition of 20°C., pure water has $\gamma_L$=72.8, $\gamma_L^d$=21.8 and $\gamma_L^p$=51.0 (units are dyn/cm in all cases); and methylene iodide, $\gamma_L$=50.8, $\gamma_L^d$=49.5 and $\gamma_L^p$=1.3.

When these values are substituted into the above formula (iii), the following formula (iv) is obtained for pure water, and the following formula (v) is obtained for methylene iodide. Here, $\theta_1$ and $\theta_2$ are the contact angle of pure water and the contact angle of methylene iodide, respectively.

$$(1+\cos\theta_1) \times 72.8 = 2(\gamma_s^d \times 21.8)^{1/2} + 2(\gamma_s^p \times 51.0)^{1/2} \quad \text{(iv)}$$

$$(1+\cos\theta_2) \times 50.8 = 2(\gamma_s^d \times 49.5)^{1/2} + 2(\gamma_s^p \times 1.3)^{1/2} \quad \text{(v)}$$

Hence, the measurement values of contact angles were substituted into the formulas (iv) and (v); $\gamma_s^d$ and $\gamma_s^p$ were calculated from the resulting simultaneous equations; and the surface free energy of each film was determined from the following formula (vi).

$$\gamma_s = \gamma_s^d + \gamma_s^p \quad \text{(vi)}$$

Incidentally, each contact angle was obtained using a contact angle measurement apparatus, Model CA-A (a product of Kyowa Kaimen Kagaku K.K.), by dropping 4 μl of water or methylene iodide on a film and, one minute thereafter, measuring the contact angle.

[Alignability of Liquid Crystal]

The presence or absence of abnormal domain in the liquid crystal cell at the time when the voltage was On or Off was examined using a polarizing microscope. When there was no abnormal domain, alignment of liquid crystal was rated as "good".

[Pretilt Angle of Liquid Crystal Display Device]

A liquid crystal display device was measured for pretilt angle by a crystal rotation method using a He-Ne laser beam, in accordance with the method described in "T. J. Schffer et al., J. Appl. Phys., 19, 2013 (1980)".

[Residual Voltage of Liquid Crystal Display Device]

A DC voltage (5 V) was applied to a liquid crystal display device at a temperature condition of 80° C. for 2 hours and then, the voltage application was stopped. Thereafter, the maximum voltage remaining in the liquid crystal display device was measured.

[Reliability Test of Liquid Crystal Display Device (Presence or Absence of Display Defect]

A liquid crystal display device was driven with a rectangular wave of 5 V and 60 Hz, in a high-temperature high-humidity environment (temperature: 70° C., relative humidity: 80%). After a lapse of 1,500 hours, the presence or absence of white stain-like display defect was observed through a polarizing microscope.

Synthesis Example 1

Into 2,000 g of N-methyl-2-pyrrolidone were dissolved 224.17 g (1.00 mole) of 2,3,5-tricarboxycyclopentylacetic acid dianhydride, 102.73 g (0.95 mole) of p-phenylenediamine and 26.04 g (0.05 mole) of cholesteryl 3,5-diaminobenzoate. The resulting solution was allowed to react at 50° C. for 6 hours. The resulting reaction solution was poured into a large excess of pure water to precipitate a reaction product. Thereafter, the solid was separated, washed with pure water, and dried at 40° C. under reduced pressure for 15 hours to obtain 335.3 g of a polymer (A-1) having a logarithmic viscosity (ηln) of 1.31 dl/g, an imidization degree of 0% and a surface free energy of 52.2 dyn/cm.

Synthesis Example 2

30.0 Grams of the polymer (A-1) obtained in Synthetic Example 1 was dissolved in 570 g of γ-butyrolactone. Thereto were added 33.3 g of pyridine and 25.8 g of acetic anhydride, and the dehydration and ring closure of the resulting solution was conducted at 110° C. for 3 hours. Then, the precipitation, separation, washing and drying of the reaction product were carried out in the same manner as in Synthesis Example 1 to obtain 28.0 g of a polymer (A-2) having a logarithmic viscosity (ηln) of 1.33 dl/g, an imidization degree of 95% and a surface free energy of 44.6 dyn/cm.

Synthesis Example 3

27.8 Grams of a polymer (A-3) having a logarithmic viscosity (ηln) of 1.13 dl/g, an imidization degree of 80% and a surface free energy of 45.9 dyn/cm was obtained in the same manner as in Synthesis Example 2 except that the amounts of pyridine and acetic anhydride were changed to 13.3 g and 17.2 g, respectively.

Synthesis Example 4

27.5 Grams of a polymer (A-4) having a logarithmic viscosity (ηln) of 0.86 dl/g, an imidization degree of 45% and a surface free energy of 48.8 dyn/cm was obtained in the same manner as in Synthesis Example 1 except the amounts of pyridine and acetic anhydride were changed to 6.7 g and 8.6 g, respectively.

Synthetic Example 5

330.6 Grams of a polymer (B-1) having a logarithmic viscosity (ηln) of 1.18 dl/g, an imidization degree of 0% and a surface free energy of 50.2 dyn/cm was obtained in the same manner as in Synthesis Example 1 except that cholesteryl 3,5-diaminobenzoate was replaced by 21.12 g (0.05 mole) of the diamine compound of the formula (20). Then, 26.9 g of a polymer (B-2) having a logarithmic viscosity (ηln) of 1.07 dl/g, an imidization degree of 93% and a surface free energy of 43.8 dyn/cm was obtained in the same manner as in Synthesis Example 2 except that the polymer (A-1) was replaced by 30.0 g of the polymer (B-1). Further, 26.7 g of a polymer (B-3) having a logarithmic viscosity (ηln) of 0.89 dl/g, an imidization degree of 82% and a surface free energy of 44.6 dyn/cm was obtained in the same manner as in Synthesis Example 3 except that the polymer (A-1) was replaced by 30.0 g of the polymer (B-1).

Synthetic Example 6

420.9 Grams of a polymer (C-1) having a logarithmic viscosity (ηln) of 1.02 dl/g, an imidization degree of 0% and a surface free energy of 50.1 dyn/cm was obtained in the same manner as in Synthesis Example 1 except that 2,3,5-tricarboxycyclopentylacetic acid dianhydride was replaced by 314.30 g (1.00 mole) of 1,3,3a,4,5,9b-hexahydro-8-methyl-5-(tetrahydro-2,5-dioxo-3-furanyl)-naphtho[1,2-c]furan-1,3-dione. Then, 27.5 g of a polymer (C-2) having a logarithmic viscosity (ηln) of 0.86 dl/g, an imidization degree of 99% and a surface free energy of 42.2 dyn/cm was obtained in the same manner as in Synthesis Example 2 except that the polymer (A-1) was replaced by 30.0 g of the polymer (C-1).

Synthesis Example 7

313.0 Grams of a polymer (D-1) having a logarithmic viscosity (ηln) of 1.89 dl/g, an imidization degree of 0% and a surface free energy of 57.2 dyn/cm was obtained in the same manner as in Synthesis Example 1 except that 218.12 g (1.00 mole) of pyromellitic acid dianhydride was used as the tetracarboxylic acid dianhydride and 108.14 g (1.00 mole) of p-phenylenediamine was used as the diamine compound.

Synthesis Example 8

603.0 Grams of a polymer (E-1) having a logarithmic viscosity (ηln) of 1.59 dl/g, an imidization degree of 0% and a surface free energy of 53.3 dyn/cm was obtained in the same manner as in Synthesis Example 1 except that 224.17 g (1.00 mole) of 1,3-dimethyl-1,2,3,4-cyclobutanetetracarboxylic acid dianhydride was used as the tetracarboxylic acid dianhydride and 410.52 g (1.00 mole) of 2,2-bis[4-(4-aminophenoxy)phenyl]propane was used as the diamine compound.

Synthesis Example 9

315.7 Grams of a polymer (F-1) having a logarithmic viscosity (ηln) of 1.69 dl/g was obtained in the same manner as in Synthesis Example 1 except that 108.14 g (1.00 mole) of p-phenylenediamine was used as the diamine compound. Then, 28.4 g of a polymer (F-2) having a logarithmic viscosity ( n ln) of 1.70 dl/g, an imidization degree of 95% and a surface free energy of 57.5 dyn/cm was obtained in the same manner as in Synthesis Example 2 except that the polymer (A-1) was replaced by 30.0 g of the polymer (F-1).

Synthesis Example 10

Into 1,300 g of N-methyl-2-pyrrolidone were dissolved 224.17 g (1.00 mol) of 2,3,5-tricarboxycyclopentylacetic acid dianhydride, 97.33 g (0.90 mole) of p-phenylenediamine and 42.24 g (0.10 mole) of the diamine compound of the formula (20). The resulting solution was allowed to react at 40° C. for 6 hours. The resulting reaction solution was poured into a large excess of pure water to precipitate a reaction product. The solid was separated, washed with pure water, and dried at 40° C. under reduced pressure for 15 hours to obtain 334.9 g of a polymer (a-1) having a logarithmic viscosity (ηln) of 1.35 dl/g and an imidization degree of 0%.

30.0 Grams of the obtained polymer (a1) was dissolved in 570 g of γ-butyrolactone. Thereto were added 33.3 g of pyridine and 25.8 g of acetic anhydride, and the dehydration and ring closure of the resulting solution was conducted at 110° C. for 4 hours. Then, the precipitation, separation, washing and drying of the reaction product were conducted in the same manner as in Synthesis Example 1 to obtain 28.3 g of a polymer (a-2) having a logarithmic viscosity (ηln) of 1.36 dl/g and an imidization degree of 90%.

Synthesis Example 11

416.76 Grams of a polymer (a-3) having a logarithmic viscosity (ηln) of 1.32 dl/g and an imidization degree of 0% was obtained in the same manner as in Synthesis Example 10 except that the tetracarboxylic acid dianhydride used in Synthesis Example 10 was replaced by 314.30 g (1.00 mole) of 1,3,3a,4,5,9b-hexahydro-8-methyl-5-(tetrahydro-2,5-dioxo-3-furanyl)-naphtho[1,2-c]furan-1,3-dione. Then, 28.5 g of a polymer (a-4) having a logarithmic viscosity (ηln) of 1.28 dl/g and an imidization degree of 100% was obtained in the same manner as in Synthesis Example 2 except that the polymer (A-1) was replaced by 30.0 g of the polymer (a-3) and that the reaction temperature in dehydration and ring closure was changed to 80° C.

Synthesis Example 12

305.7 Grams of a polymer (a-5) having a logarithmic viscosity (ηln) of 1.78 dl/g and an imidization degree of 0% was obtained in the same manner as in Synthesis Example 1 except that the diamine compound used in Synthesis Example 10 was changed to 108.16 g (1.00 mole) of p-phenylenediamine.

Synthesis Example 13

299.9 Grams of a polymer (a-6) having a logarithmic viscosity (ηln) of 2.01 dl/g and an imidization degree of 0% was obtained in the same manner as in Synthesis Example 1 except that 218.12 g (1.00 mole) of pyromellitic acid dianhydride was used as the tetracarboxylic acid dianhydride used in Synthetic Example 12 and 108.16 g (1.00 mole) of p-phenylenediamine was used as the diamine compound used in Synthetic Example 12.

Example 1

(1) Preparation of liquid crystal alignment agent 1.0 Gram of the polymer (A-1) obtained in Synthetic Example 1 and 4.0 g of the polymer (A-2) obtained in Synthetic Example 2 were dissolved in N-methyl-2-pyrrolidone to obtain a solution having a solid content of 4% by weight. The solution was passed through a filter having a pore diameter of 1 μm to prepare a liquid crystal alignment agent.

(2) Preparation of liquid crystal display device (i) The liquid crystal alignment agent prepared above was coated on a transparent electroconductive film (comprising an ITO film) provided on one surface of a glass substrate of 1 mm in thickness, by using a printing machine for formation of liquid crystal alignment film. The coated substrate was dried at 180° C. for 1 hour to form a coating film. The coating film was measured for uniformity, which gave an average film thickness of 489 and the maximum thickness difference of 17.

(ii) The coating film surface was subjected to a rubbing treatment, using a rubbing machine having a roll wound round with a rayon cloth, to impart it with alignability for the liquid crystal molecules, thereby producing a liquid crystal alignment film. The rubbing conditions were roll rotation of 500 rpm and stage transfer speed of 1 cm/sec.

(iii) Thus was produced two substrates each having a liquid crystal alignment film. The periphery of each substrate was coated, by a screen printing, with an epoxy resin containing spherical aluminum oxide (particle diameter of 17 μm). The resulting two substrates were allowed to face each other via a gap in such a way that the rubbing directions of the two liquid crystal alignment films became perpendicular or parallel in an opposite direction to each other. The peripheries of the two substrates were allowed to abut on each other and press-bonded, and the adhesive was cured.

(iv) Into the cell gap defined by the surface of the substrates and the adhesive at the peripheries was filled a nematic liquid crystal, MLC-2001 (a product of Merck Japan Ltd). Then, a filling hole was sealed with an epoxy type adhesive to constitute a liquid crystal cell. Thereafter, on the outer surfaces of the liquid crystal cell was adhered polarizing films in such a way that the polarization direction of the polarizing film became identical with the rubbing direction of liquid crystal alignment film formed on one side of the substrate, whereby a liquid crystal display device was produced.

The liquid crystal display device was evaluated for alignment of liquid crystal and pretilt angle. The alignment of liquid crystal was good, and the pretilt angle was as high as 5.3 0. The residual voltage was as low as 0.16 V. The results are shown in Table 1.

Examples 2 to 9

Using the polymers obtained in Synthesis Examples 1 to 8, in the formulation shown in Table 1, various liquid crystal alignment agents of the present invention were produced in the same manner as in Example 1 (1). Using the thus-obtained liquid crystal alignment agents, various liquid crystal display devices were produced in the same manner as in Example 1 (2).

Each of the liquid crystal display devices was evaluated for alignment of liquid crystal, pretilt angle and residual voltage. The results are shown in Table 1.

TABLE 1

| Example | Polymers Imidization degree (%) Surface free energy (dyn/cm) | | Composition ratio of polymers (Weight ratio) | Surface free energy of alignment film (dyn/cm) | Alignability of liquid crystal | Residual voltage (V) | Pretilt angle (°) |
| --- | --- | --- | --- | --- | --- | --- | --- |
| 1 | A-1 0 52.2 | A-2 95 44.6 | 20:80 | 45.4 | Good | 0.16 | 5.3 |
| 2 | A-1 0 52.2 | A-2 95 44.6 | 50:50 | 45.7 | Good | 0.18 | 5.0 |
| 3 | A-1 0 52.2 | A-2 95 44.6 | 80:20 | 46.2 | Good | 0.20 | 4.8 |
| 4 | A-2 95 44.6 | A-3 80 45.9 | 50:50 | 45.3 | Good | 0.19 | 5.5 |
| 5 | A-2 95 44.6 | A-4 45 48.8 | 20:80 | 45.6 | Good | 0.18 | 5.2 |
| 6 | B-1 0 50.2 | B-2 93 43.8 | 50:50 | 45.4 | Good | 0.20 | 4.5 |
| 7 | C-1 0 50.1 | C-2 99 42.2 | 50:50 | 42.8 | Good | 0.22 | 4.9 |
| 8 | D-1 0 57.2 | A-2 95 44.6 | 50:50 | 45.8 | Good | 0.11 | 4.8 |
| 9 | E-1 0 53.3 | A-2 95 44.6 | 50:50 | 46.1 | Good | 0.23 | 4.7 |

Examples 10 to 15

Using the polymers obtained in Synthesis Examples 10 to 13 and epoxy compounds, in the formulation shown in Table 2, various liquid crystal alignment agents of the present invention were produced in the same manner as in Example 1 (1). Using the thus-obtained liquid crystal alignment agents, various liquid crystal display devices were produced in the same manner as in Example 1 (2).

Each of the liquid crystal display devices was evaluated for alignment of liquid crystal, pretilt angle and residual voltage. The results are shown in Table 2.

TABLE 2

| Ex. | Polymers Imidization degree (%) Surface free energy (dyn/cm) | | Composition ratio of polymers (Weight ratio) | Epoxy compound (b) Weight ratio of (a):(b) | Surface free energy of alignment film (dyn/cm) | Alignability of liquid crystal | Residual voltage (V) | Pretilt angle (°) | Reliability |
|---|---|---|---|---|---|---|---|---|---|
| 10 | a-2 90 43.0 | a-5 0 54.4 | 20:80 | b-1 80:20 | 44.3 | Good | 0.03 | 4.7 | Good |
| 11 | a-2 90 43.0 | a-5 0 54.4 | 6:94 | b-1 80:20 | 44.4 | Good | 0.03 | 4.5 | Good |
| 12 | a-2 90 43.0 | a-6 0 58.3 | 20:80 | b-1 80:20 | 45.1 | Good | 0.05 | 5.0 | Good |
| 13 | a-4 100 42.1 | a-6 0 58.3 | 20:80 | b-1 80:20 | 44.9 | Good | 0.09 | 4.8 | Good |
| 14 | a-2 90 43.0 | a-5 0 54.4 | 20:80 | b-2 80:20 | 44.2 | Good | 0.08 | 5.1 | Good |
| 15 | a-2 90 43.0 | a-5 0 54.4 | 20:80 | b-3 80:20 | 44.3 | Good | 0.15 | 5.0 | Good |

Ex.: Example

Comparative Examples 1 to 5

Using the polymers obtained in Synthesis Examples 1 to 15, in the formulation shown in Table 3, various liquid crystal alignment agents for comparison were produced in the same manner as in Example 1 (1). Using the thus-obtained liquid crystal alignment agents, various liquid crystal display devices were produced in the same manner as in Example 1 (2).

Each of the liquid crystal display devices was evaluated for alignment of liquid crystal, pretilt angle and residual voltage. The results are shown in Table 3.

TABLE 3

| Comp. Ex. | Polymers Imidization degree (%) Surface free energy (dyn/cm) | | Composition ratio of polymers (Weight ratio) | Epoxy compound (b) Weight ratio of (a):(b) | Surface free energy of alignment film (dyn/cm) | Alignability of liquid crystal | Residual voltage (V) | Pretilt angle (°) |
|---|---|---|---|---|---|---|---|---|
| 1 | A-1 0 52.2 | — | — | — | 52.2 | Bad | 0.08 | 1.1 |
| 2 | A-2 95 44.6 | — | — | — | 44.6 | Good | 0.89 | 7.3 |
| 3 | A-2 95 44.6 | B-3 82 44.6 | 50:50 | — | 44.6 | Good | 0.65 | 6.7 |
| 4 | A-1 0 52.2 | F-2 95 57.5 | 50:50 | — | 56.0 | Good | 0.73 | 4.3 |
| 5 | a-2 100 43.0 | | — | b-1 80:20 | 45.0 | Good | 11.1 | 4.9 |

Comp. Ex.: Comparative Example

In Table 2 and Table 3, the symbols for epoxy compounds are for the following epoxy compounds.

b-1: N,N,N',N'-Tetraglycidyl-4,4'-diaminodiphenylmethane
b-2: 1,3-Bis(N,N'-diglycidylaminomethyl)cyclohexane
b-3: Trimethylolpropane triglycidyl ether According to the present invention there is obtained a liquid crystal alignment agent capable of giving a liquid crystal display device having less stuck image and high pretilt angle.

The liquid crystal device having a liquid crystal alignment film formed with the liquid crystal alignment agent of the invention can be favorably used in a TN type liquid crystal display device and, by selecting the liquid crystal to be used, also in liquid crystal display devices of IPS (in-plane-switching) type, STN (super twisted nematic) type, SH (super homeotropic) type, ferroelectric type, antiferroelectric type, etc.

The liquid crystal display device having a liquid crystal alignment film formed with the liquid crystal alignment agent of the invention is superior in alignment of liquid crystal and reliability, and can be effectively used in various display devices such as desk calculator, wrist watch, desk clock, digital display panel, word processor, personal computer, liquid crystal TV and the like.

We claim:

1. A liquid crystal alignment agent comprising a mixture of polyamic acids and imidized polymers wherein the imidized polymers are obtained by dehydration and ring closure of polyamic acid, and wherein the polymer having a higher imidization degree has a smaller surface free energy.

2. The liquid crystal alignment agent according to claim 1, wherein the difference in imidization degree between the polymer of highest imidization degree and the polymer of lowest imidization degree is 5% or more and the surface free energy of a liquid crystal alignment film obtained from the liquid crystal alignment agent is 40 to 60 dyn/cm.

3. The liquid crystal alignment agent according to claim 1, further comprising an epoxy compound and wherein the polyamic acids and the imidized polymers contained in the liquid crystal alignment agent have an average imidization degree of 5 to 40%.

4. The liquid crystal alignment agent according to claim 3, wherein the epoxy compound is a nitrogen-containing epoxy compound.

5. The liquid crystal alignment agent according to claim 1, wherein each of the polyamic acids and imidized polymers independently comprise, as a constituent, at least one tetracarboxylic acid dianhydride selected from the group consisting of butanetetracarboxylic acid dianhydride, 1,2,3,4-cyclobutanetetracarboxylic acid dianhydride, 1,3-dimethyl-1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 5-(2,5-dioxotetrahydrofural)-3-methyl-3-cyclohexane-1,2-dicarboxylic acid dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho-[1,2-c]furan-1, 3-dione, 1,3,3a,4,5,9b-hexahydro-5,8-dimethyl-5-(tetrahydro-2,5-dioxo- 3-furanyl)-naphtho[1,2-c]furan-1,3-dione, bicyclo[2,2,2]-octo-7-ene-2,3,5,6-tetracarboxylic acid dianhydride, pyromellitic dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride and the compounds represented by the following formulas (5) to (8):

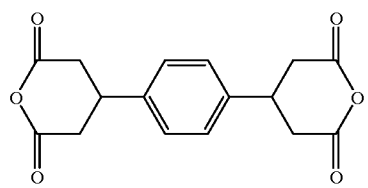

(5)

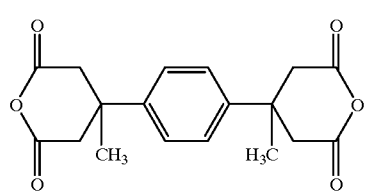

(6)

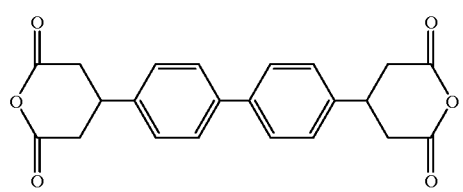

(7)

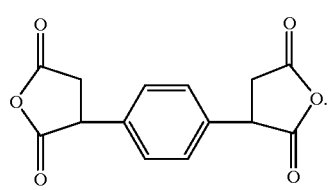

(8)

6. The liquid crystal alignment agent according to claim 1, wherein each of the polyamic acids and imidized polymers independently comprise, as a constituent, at least one diamine compound selected from the group consisting of p-phenylene diamine, 4,4'-diaminodiphenylmethane, 3,4'-diaminodiphenylmethane, 3,3'-diaminodiphenylmethane, 4,4'-diaminodiphenyl sulfide, 1,5-diaminonaphthalene, 2,7-diaminofluorene, 4,4'-diaminodiphenyl ether, 2,2-bis[4-(4-aminophenoxy)phenyl]-propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenytenediisopropylidene)bisaniline, 4,4'-(m-phenylenediisopropylidene)bisaniline, 2,2-bis[4-(4-aminophenoxy)phenyl]sulfone, 1,4-cyclohexanediamine, 4,4'-methylene bis(cyclohexylamine), 1,4-bis(4-aminophenoxy)-benzene, 4,4'-bis(4-aminophenoxy)biphenyl, the compounds represented by the following formulas (9) to (21):

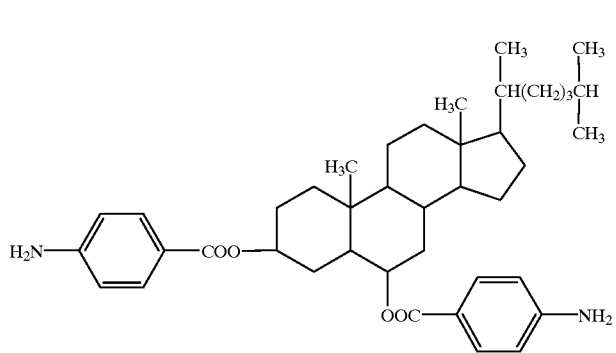
(9)
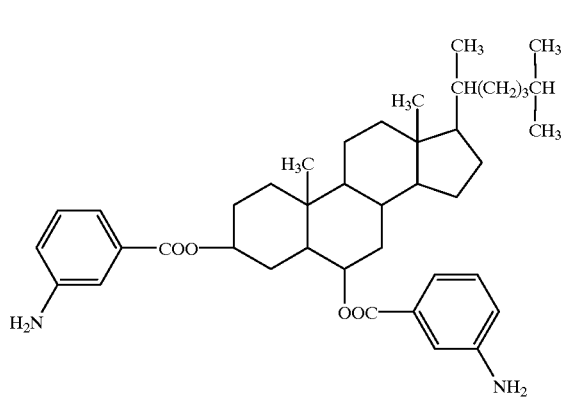
(10)
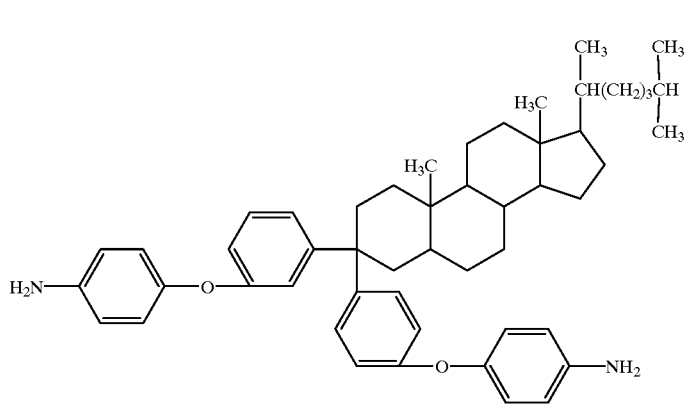
(11)
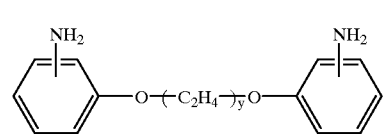
(12)
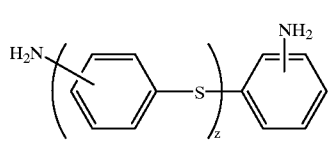
(13)
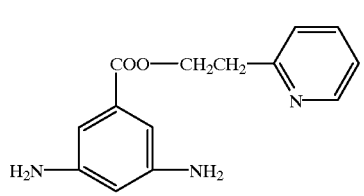
(14)

-continued
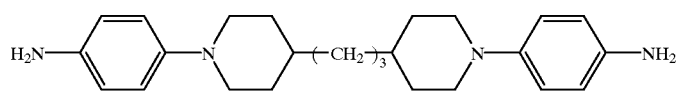
(15)
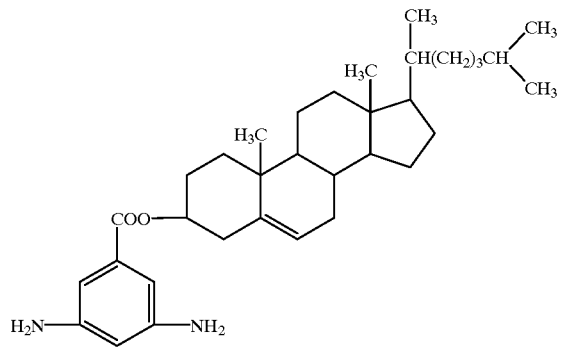
(16)
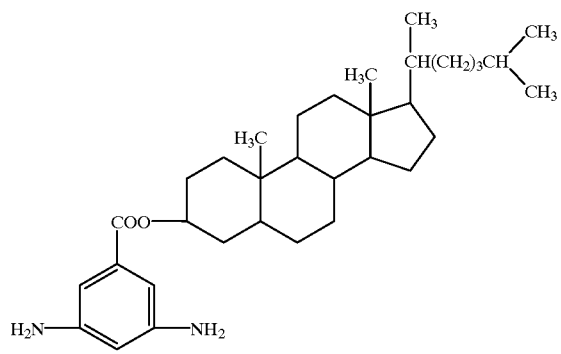
(17)
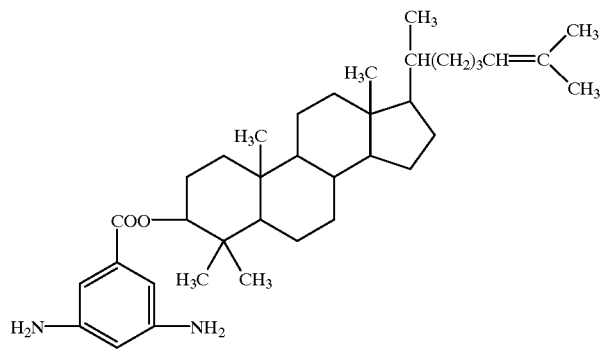
(18)
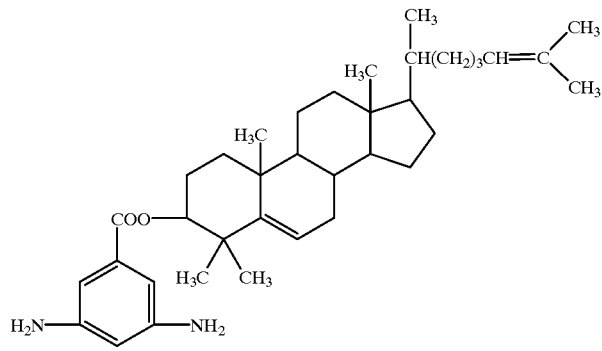
(19)

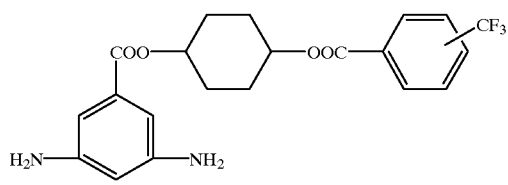

(20)

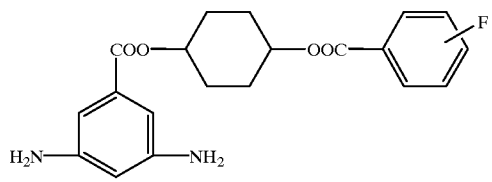

(21)

2,6-diaminopyridine, 3,4-diaminopyridine, 2,4-diaminopyridine and 3,6-diaminoacridine.

7. The liquid crystal alignment agent according to claim 3, wherein each of the polyamic acids and imidized polymers independently comprise, as a constituent, at least one kind of tetracarboxylic acid dianhydride selected from the group consisting of 1,2,3,4-cyclobutanetetracarboxylic acid dianhydride, 1,3-dimethyl-1,2,3,4-cyclobutanetetracarboxylic acid dianhydride, 2,3,5-tricarboxycyclopentylacetic acid dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, pyromellitic acid dianhydride and the compounds represented by the following formula (5):

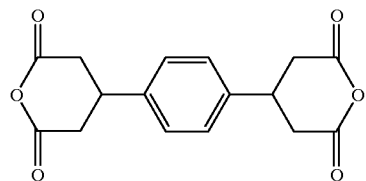

(5)

8. The liquid crystal alignment agent according to claim 4, wherein the nitrogen-containing epoxy compound is at least one compound selected from the group consisting of nitrogen-containing epoxy compounds derived from an aromatic monamine, nitrogen-containing epoxy compounds derived from an aromatic diamine and nitrogen-containing epoxy compounds derived from an alicyclic diamine.

9. The liquid crystal alignment agent according to claim 8, wherein the nitrogen-containing epoxy compound is at least one compound selected from the group consisting of N,N-diglycidylaniline, N,N,N',N'-tetraglycidyl-4-4'-diaminodiphenylmethane and 1,3-bis(N,N'-diglycidylaminomethyl)cyclohexane.

10. A liquid crystal alignment film, comprising the liquid crystal alignment agent as claimed in claim 1.

* * * * *